United States Patent
Shibata

(10) Patent No.: US 9,621,757 B2
(45) Date of Patent: Apr. 11, 2017

(54) IMAGE FORMING APPARATUS INCLUDING REINFORCING MEMBERS ON BOTTOM PLATE OF SCANNER

(71) Applicant: KYOCERA Document Solutions Inc., Osaka (JP)

(72) Inventor: Naoki Shibata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/003,867

(22) Filed: Jan. 22, 2016

(65) Prior Publication Data
US 2016/0219181 A1 Jul. 28, 2016

(30) Foreign Application Priority Data
Jan. 27, 2015 (JP) .................. 2015-013303

(51) Int. Cl.
*H04N 1/00* (2006.01)
*H04N 1/04* (2006.01)
(Continued)

(52) U.S. Cl.
CPC .............. *H04N 1/04* (2013.01); *B65H 31/02* (2013.01); *G03G 21/1609* (2013.01);
(Continued)

(58) Field of Classification Search
None
See application file for complete search history.

(56) References Cited

U.S. PATENT DOCUMENTS 7,821,681 B2 * 10/2010 Matsumoto ........ H04N 1/00519
358/401
7,855,813 B2 * 12/2010 Yamada ............. H04N 1/00519
271/160
(Continued)

FOREIGN PATENT DOCUMENTS

| JP | 2010-074625 A | 4/2010 |
| JP | 2013-172314 A | 9/2013 |
| JP | 2014-232194 A | 12/2014 |

OTHER PUBLICATIONS

An Office Action; "Notice of Reasons for Rejection," issued by the Japanese Patent Office on Oct. 18, 2016, which corresponds to Japanese Patent Application No. 2015-013303 and is related to U.S. Appl. No. 15/003,867.

*Primary Examiner* — Scott A Rogers
(74) *Attorney, Agent, or Firm* — Studebaker & Brackett PC

(57) ABSTRACT

An image forming apparatus includes an image scanning section, an exit tray, and an upper housing. The image scanning section scans an image of an original document. The exit tray is disposed below the image scanning section. A sheet bearing an image is ejected onto the exit tray. The upper housing houses the image scanning section. The image forming apparatus has a sheet ejection space that is formed between the exit tray and the upper housing. A user's hand is inserted into the sheet ejection space for taking out the sheet from the exit tray. The upper housing includes a bottom plate having a surface that faces the exit tray. The bottom plate includes a plurality of reinforcing members that are disposed on the surface of the bottom plate and that extend in a direction in which the user takes out the recording medium from the exit tray.

6 Claims, 5 Drawing Sheets

(51) Int. Cl.
*H04N 1/10* (2006.01)
*G03G 21/16* (2006.01)
*G03G 15/00* (2006.01)
*G06K 15/16* (2006.01)
*B65H 31/02* (2006.01)

(52) U.S. Cl.
CPC ............ G06K 15/16 (2013.01); H04N 1/0057 (2013.01); H04N 1/00527 (2013.01); H04N 1/00543 (2013.01); H04N 1/00559 (2013.01); H04N 1/00591 (2013.01); H04N 1/00615 (2013.01); H04N 1/00631 (2013.01); H04N 1/0461 (2013.01); H04N 1/10 (2013.01); H04N 1/1043 (2013.01); H04N 1/1065 (2013.01); *B65H 2301/4212* (2013.01); *B65H 2402/44* (2013.01); *B65H 2405/115* (2013.01); *B65H 2511/17* (2013.01); *B65H 2515/40* (2013.01); *B65H 2601/24* (2013.01); *B65H 2601/325* (2013.01); *B65H 2801/06* (2013.01); *G03G 15/6552* (2013.01); *G03G 2215/0132* (2013.01); *H04N 2201/0091* (2013.01)

(56) References Cited

U.S. PATENT DOCUMENTS

| | | | | |
|---|---|---|---|---|
| 7,912,418 B2* | 3/2011 | Hattori | ............... | G03G 15/6573 271/188 |
| 8,244,167 B2* | 8/2012 | Andoh | ............... | G03G 15/6552 399/361 |
| 8,467,115 B2* | 6/2013 | Kozushi | ............. | G03G 21/1695 358/474 |
| 2007/0223055 A1 | 9/2007 | Moribe | | |

* cited by examiner

IMAGE FORMING APPARATUS INCLUDING REINFORCING MEMBERS ON BOTTOM PLATE OF SCANNER

INCORPORATION BY REFERENCE

The present application claims priority under 35 U.S.C. §119 to Japanese Patent Application No. 2015-013303, filed Jan. 27, 2015. The contents of this application are incorporated herein by reference in their entirety.

BACKGROUND

The present disclosure relates to image forming apparatuses.

In a known image forming apparatus, an exit tray onto which a recording medium bearing an image is ejected is disposed below a scanning section that scans an image of an original document.

The image scanning section of the image forming apparatus may include a bottom plate having projections and recesses. The recesses have a characteristic that deformation perpendicular to the bottom plate in response to heat occurs downward. The projections have a characteristic that deformation perpendicular to the bottom plate in response to heat occurs upward.

In the image forming apparatus, variation in distance between the scanning section and an original document due to thermal influence can be reduced.

SUMMARY

An image forming apparatus according to the present disclosure is an image forming apparatus that forms an image on a recording medium and includes a scanning section, an exit tray, and a housing. The scanning section scans an image of an original document. The exit tray is disposed below the scanning section. A recording medium bearing an image is ejected onto the exit tray. The housing houses the scanning section. The image forming apparatus has a sheet ejection space that is formed between the exit tray and the housing. A user's hand is inserted into the sheet ejection space for taking out the recording medium from the exit tray. The housing includes a bottom plate having a surface that faces the exit tray. The bottom plate includes a plurality of reinforcing members that are disposed on the surface of the bottom plate facing the exit tray and that extend in a direction in which the user takes out the recording medium from the exit tray.

BRIEF DESCRIPTION OF THE DRAWINGS

FIG. 5A illustrates an embodiment. FIG. 5B illustrates a first comparative example. FIG. 5C illustrates a second comparative example.

DETAILED DESCRIPTION

Figure 1:
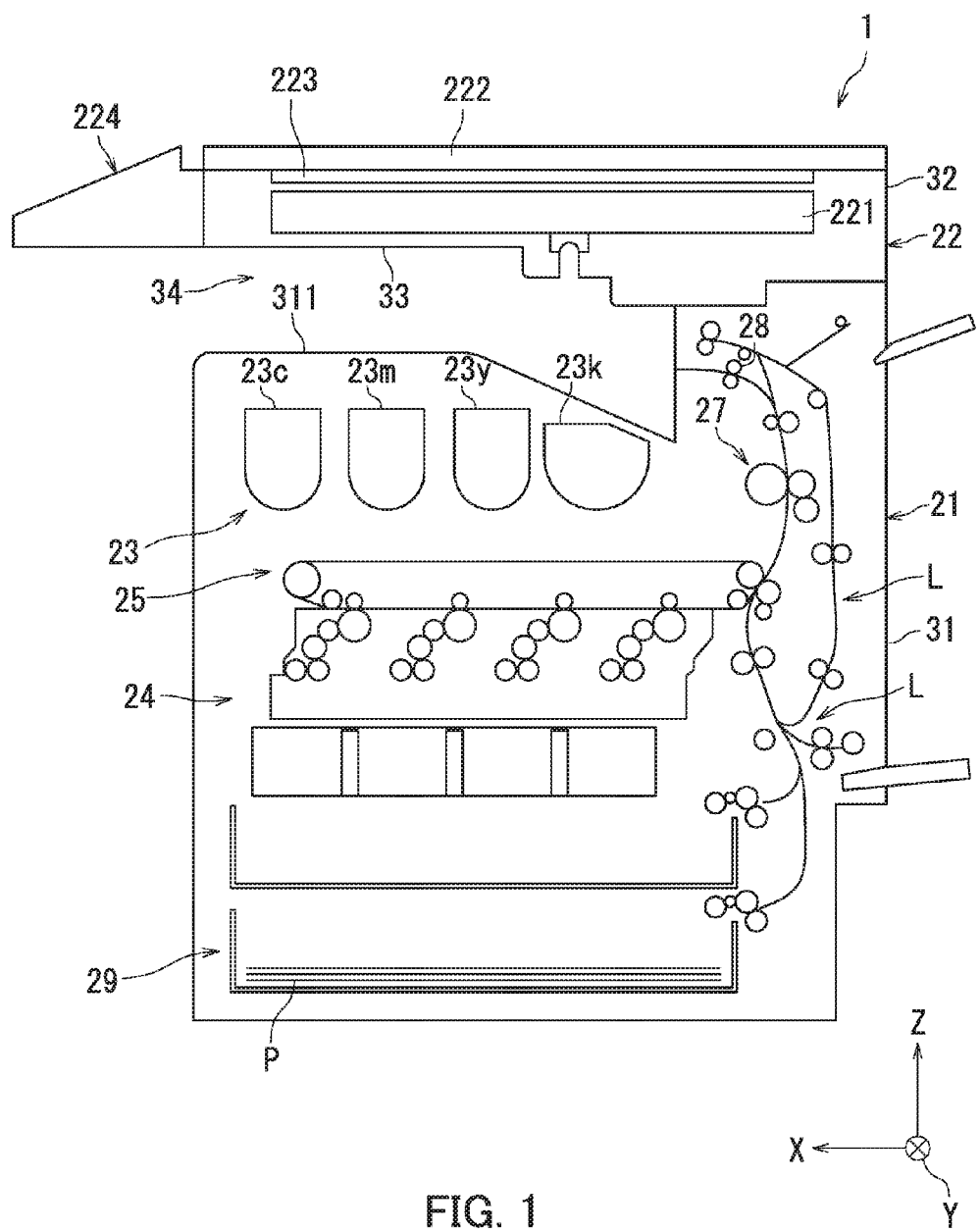
FIG. 1 is a side view illustrating a configuration of an image forming apparatus according to an embodiment of the present disclosure.

With reference to the accompanying drawings (FIGS. 1-5C), an embodiment of the present disclosure will be described below. Elements that are the same or equivalent are indicated by the same reference signs in the drawings, and description thereof is not repeated. FIGS. 1-5C show respective arrows of X, Y, and Z axes that indicate respective positive directions of the X, Y, and Z axes defined as forward, leftward, and upward directions of an image forming apparatus 1, respectively.

As illustrated in FIG. 1, the image forming apparatus 1 is a color copier that includes an image forming section 21 and an image scanning section 22. The image forming section 21 forms an image on a recording sheet P. The image scanning section 22 scans an image of an original document.

A configuration of the image forming section 21 will be described first. The image forming section 21 includes a lower housing 31, a sheet feed section 29, a conveyance section L, a toner replenishing unit 23, an image forming unit 24, a transfer section 25, a fixing section 27, an ejection section 28, and an exit tray 311.

The lower housing 31 houses the image forming section 21 constituted by the sheet feed section 29, the conveyance section L, the toner replenishing unit 23, the image forming unit 24, the transfer section 25, the fixing section 27, and the ejection section 28. The sheet feed section 29 is disposed in a lower part of the lower housing 31 and feeds a recording sheet P to the conveyance section L. The sheet feed section 29 is capable of accommodating a plurality of recording sheets P and feeds the uppermost recording sheet P one at a time to the conveyance section L. For the sake of convenience, a recording sheet P is hereinafter referred to as a sheet P.

The conveyance section L conveys the sheet P fed by the sheet feed section 29 to the ejection section 28 through the transfer section 25 and the fixing section 27.

The toner replenishing unit 23 is a container that supplies toner to the image forming unit 24 and includes four toner cartridges 23c, 23m, 23y, and 23k. The toner cartridge 23c contains a cyan toner. The toner cartridge 23m contains a magenta toner. The toner cartridge 23y contains a yellow toner. The toner cartridge 23k contains a black toner.

A configuration of the image scanning section 22 will be described next. The image scanning section 22 includes an upper housing 32, a contact image sensor (CIS) unit 221, a document cover 222, and a contact glass 223. The upper housing 32 houses the CIS unit 221 and the contact glass 223.

A sheet ejection space 34 is formed between a bottom plate 33 of the upper housing 32 and the exit tray 311. The sheet ejection space 34 is a space into which a sheet P is ejected onto the exit tray 311 from the ejection section 28 and into which a user inserts a hand for taking out a sheet P from the exit tray 311.

Figure 2:
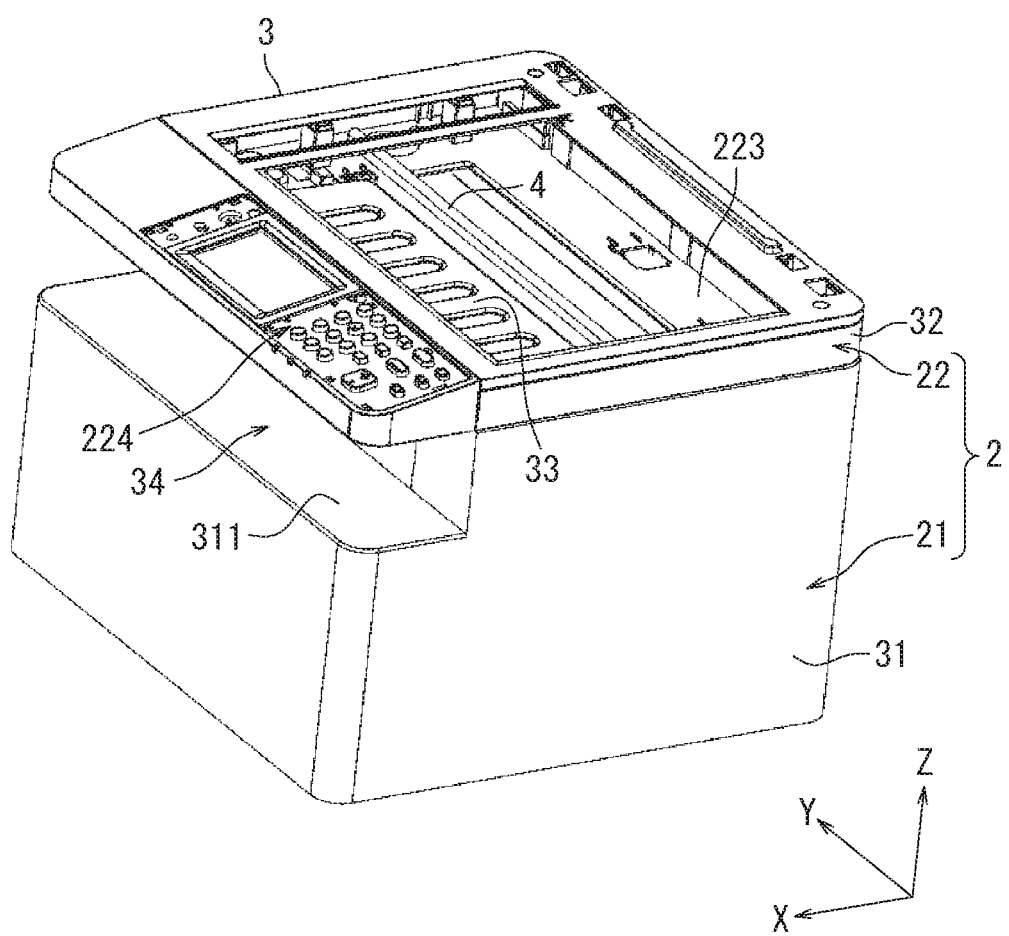
FIG. 2 is a perspective view illustrating an outer appearance of the image forming apparatus illustrated in FIG. 1.

As illustrated in FIG. 2, an operation section 224 is disposed in the upper surface of a front part of the upper housing 32 (part thereof located on a side in the positive direction of the X axis in FIG. 2). The operation section 224 includes for example a touch panel and an operation button to receive user input for operation.

A guide section 4 is located on the bottom plate 33 of the upper housing 32. The guide section 4 guides the CIS unit 221 illustrated in FIG. 1 so that the CIS unit 221 linearly moves in a sub-scanning direction (Y-axis direction in FIG. 2).

Figure 3:
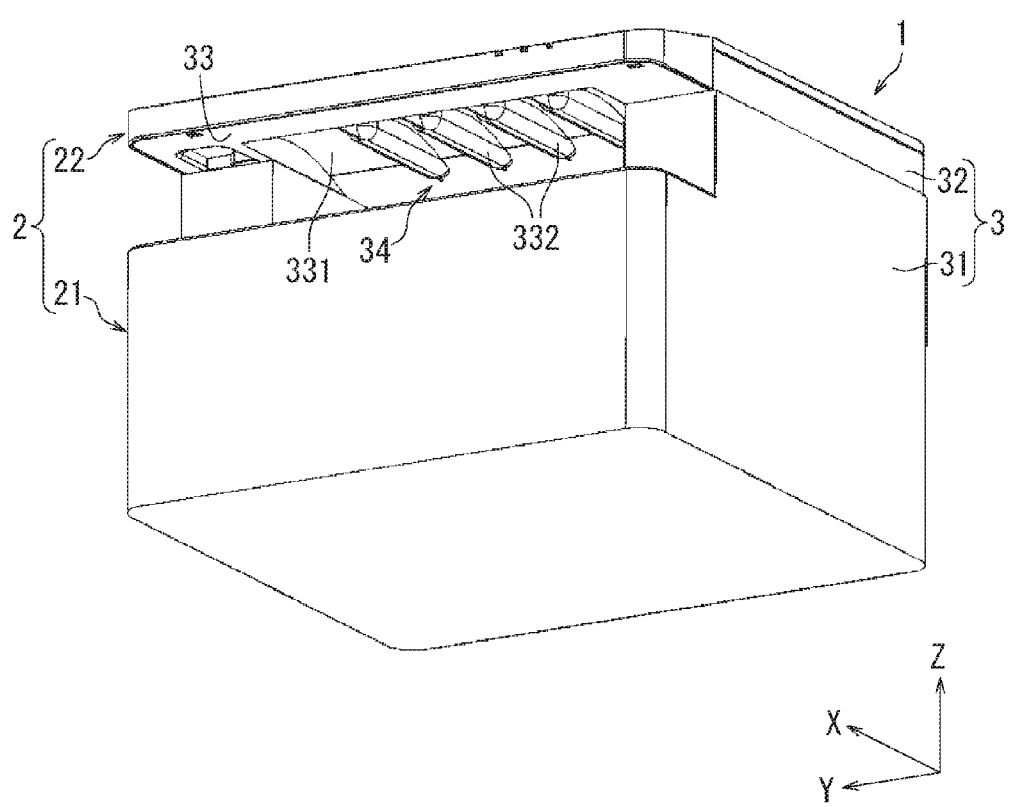
FIG. 3 is a perspective view illustrating an outer appearance of a bottom plate illustrated in FIG. 1.

A configuration for reinforcing the bottom plate 33 will be described next with reference to FIG. 3. As illustrated in FIG. 3, the bottom plate 33 includes a curved portion 331 and a plurality of reinforcing members 332. The curved portion 331 constitutes a part of the bottom plate 33 located above the sheet ejection space 34 and has a smoothly curved lower surface concaved in a direction to expand the sheet ejection space 34 (positive direction of the Z axis in FIG. 3).

As described above, the curved portion 331 has the smoothly curved surface concaved in the direction to expand the sheet ejection space 34 (positive direction of the Z axis in FIG. 3). In the above configuration, the sheet ejection space 34 can be expanded. This can allow a user to easily take out a sheet P from the exit tray 311 through insertion of a hand into the sheet ejection space 34.

The reinforcing members 332 are disposed on the lower surface of the curved portion 331 to reinforce the bottom plate 33. The reinforcing members 332 extend linearly in a direction (positive direction of the Y axis in FIG. 3) in which a user takes out a sheet P from the exit tray 311 (see FIG. 2).

As described above, the reinforcing members 332 are disposed on the lower surface of the curved portion 331. The above configuration can reinforce the bottom plate 33 as a part of the upper housing 32. As a result, the upper housing 32 of the image scanning section 22 can be increased in mechanical strength.

Further, the reinforcing members 332 extend linearly in the direction in which a user takes out a sheet P from the exit tray 311. As a result, a user's hand inserted into the sheet ejection space 34 is unlikely to be caught by the reinforcing members 332. Thus, the above configuration can allow a user to more easily take out a sheet P from the exit tray 311 through insertion of a hand into the sheet ejection space 34.

The present embodiment describes a configuration in which the reinforcing members 332 linearly extend in the direction in which a user takes out a sheet P from the exit tray 311. However, the reinforcing members 332 may extend non-linearly. For example, the reinforcing members 332 may extend in a smooth curve, for example, a substantially arc shape.

Figure 4:
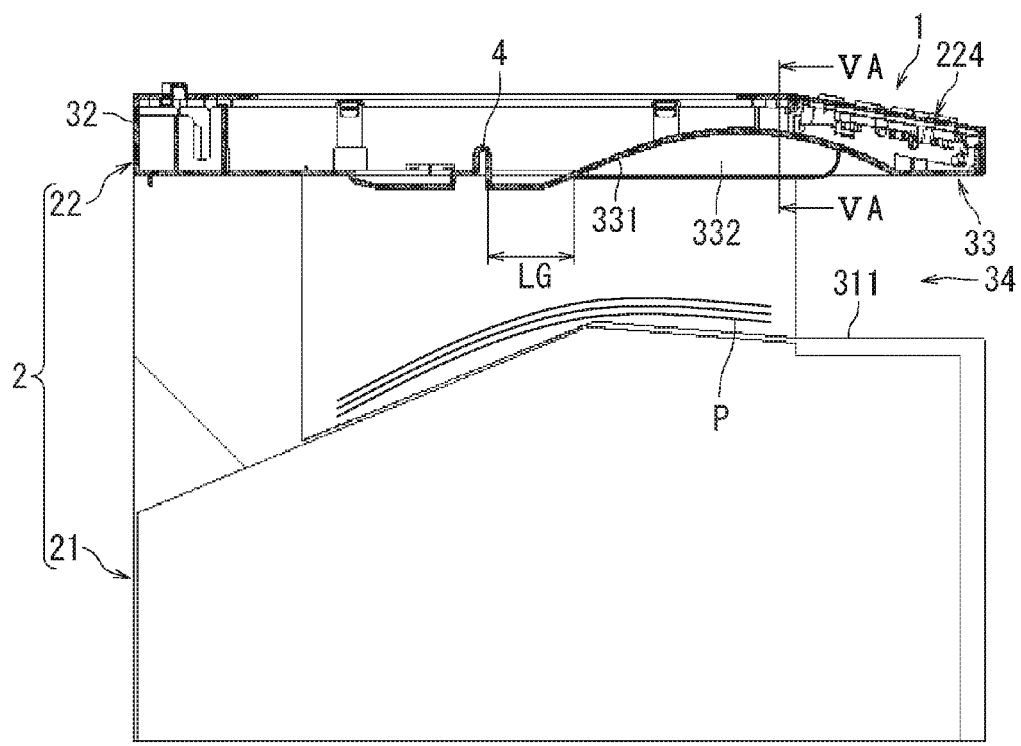
FIG. 4 is a cross sectional view illustrating a configuration of the bottom plate illustrated in FIG. 3.
Figure 4:
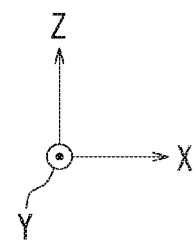

A configuration of the bottom plate 33 will be described next with reference to FIG. 4. FIG. 4 is a cross sectional view illustrating the configuration of the bottom plate 33 illustrated in FIG. 3. The guide section 4 is located substantially at a center of the bottom plate 33. The curved portion 331 and the reinforcing members 332 are located on the right side of the guide section 4 (front side of the image forming apparatus 1 or side in the positive direction of the X axis).

As illustrated in FIG. 4, the guide section 4 is a part of the bottom plate 33 that curves so as to protrude upward. The reinforcing members 332 each have a lower surface that is substantially level with a lower surface of a part of the bottom plate 33 located below the operation section 224. As illustrated in FIG. 4, the curved portion 331 of the bottom plate 33 has a substantially arc shape in cross section. The reinforcing members 332 are disposed in a region of the bottom plate 33 that is opposite to a sheet P ejected onto the exit tray 311. The reinforcing members 332 extend to the vicinity of the operation section 224 so that a predetermined space is formed between the reinforcing members 332 and the operation section 224 on a side from which a sheet P is taken out (right side in FIG. 4).

As illustrated in FIG. 4, the reinforcing members 332 are located a predetermined distance LGS (e.g., 20 mm) or more apart from the guide section 4. A distance LG between the reinforcing members 332 and the guide section 4 in the present embodiment is 30 mm, for example.

As described above, the reinforcing members 332 are located the predetermined distance LGS or more apart from the guide section 4. This arrangement can prevent a situation in which flexure of the bottom plate 33 caused by external force applied around the operation section 224 affects the guide section 4. Thus, deformation of the guide section 4 due to external force applied around the operation section 224 can be reduced.

The curved portion 331, which has the substantially arc shape in cross section, can be easily formed.

The lower surfaces of the reinforcing members 332 are substantially level with a part of the bottom plate 33 located below the operation section 224. Accordingly, a user's hand inserted into the sheet ejection space 34 is unlikely to be caught by the reinforcing members 332. Thus, the above configuration can allow a user to more easily take out a sheet P from the exit tray 311 through insertion of a hand into the sheet ejection space 34.

Figure 5A:
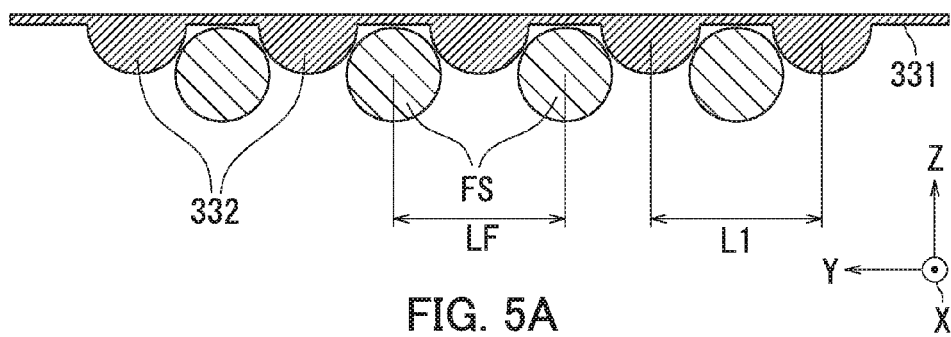
FIGS. 5A-5C each are a cross sectional view of reinforcing members taken along a line VA-VA in FIG. 4.

As illustrated in FIG. 5A, the reinforcing members 332 in the present embodiment each have a substantially semicircle shape in cross section and are arranged at regular intervals L1 in the Y axis direction in FIG. 5A. The intervals L1 between adjacent reinforcing members 332 among the reinforcing members 332 are each set in advance at a predetermined interval L1S (e.g., 10 mm). The predetermined interval L1S is set to be substantially equal to intervals LF between adjacent fingers FS of a user's hand (among four fingers from a forefinger to a little finger in the present embodiment).

As illustrated in FIG. 5A, the intervals L1 between the adjacent reinforcing members 332 are substantially equal to the intervals LF between adjacent fingers of a user's hand inserted into the sheet ejection space 34. In the above configuration, the hand inserted into the sheet ejection space 34 is more unlikely to be caught by the reinforcing members 332. Thus, the above configuration can allow a user to more easily take out a sheet P from the exit tray 311 through insertion of a hand into the sheet ejection space 34.

As described with reference to FIG. 4, the reinforcing members 332 are disposed in the region of the bottom plate 33 that is opposite to a sheet P ejected onto the exit tray 311. In the above configuration, the sheet P can be more easily taken out from the exit tray 311. The reinforcing members 332 extend to the vicinity of the operation section 224 so that the predetermined space is formed between the reinforcing members 332 and the operation section 224 on the side from which a sheet P is taken out (right side in FIG. 4). This configuration can allow a sheet P to be taken out more easily from the exit tray 311.

Figure 5B:
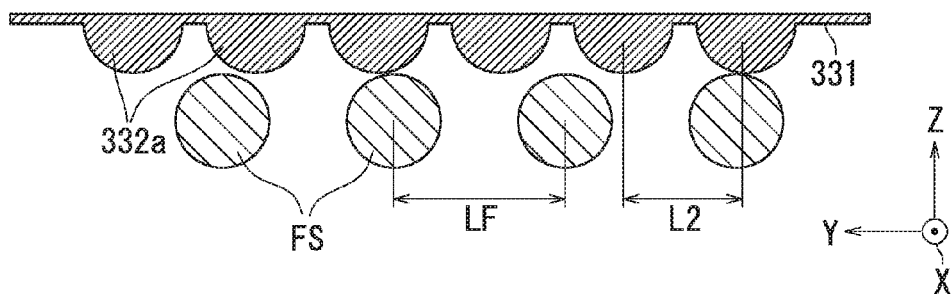

A first comparative example illustrated in FIG. 5B is different from the present embodiment illustrated in FIG. 5A in that intervals L2 between adjacent reinforcing members 332a are short. As illustrated in FIG. 5B, the reinforcing members 332a are arranged at regular intervals L2 in the Y-axis direction in FIG. 5B and each have a substantially semicircle shape in cross section. The intervals L2 between adjacent reinforcing members 332a are shorter than the intervals LF and are each set at 7 mm, for example. In the above configuration, a user's hand inserted into the sheet ejection space 34 is more liable to be caught by the reinforcing members 332 than in the embodiment illustrated in FIG. 5A.

Figure 5C:
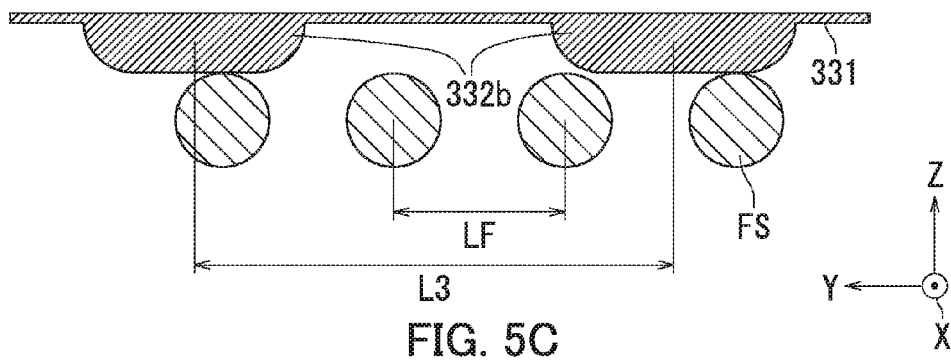

A second comparative example illustrated in FIG. 5C is different from the present embodiment illustrated in FIG. 5A in that intervals between adjacent reinforcing members 332b are long. In the second comparative example, the reinforcing members 332b are arranged at regular intervals in the Y-axis direction in FIG. 5C and each have a substantially semi-ellipsoidal shape in cross section. The intervals L3 between adjacent reinforcing members 332b are longer than the intervals LF and are each set at 25 mm, for example. In the above configuration, a user's hand inserted into the sheet ejection space 34 is more liable to be caught by the reinforcing members 332b than in the embodiment illustrated in FIG. 5A.

The embodiment of the present embodiment has been described so far with reference to the drawings. However, the present disclosure is not limited to the above embodiment and a wide range of alterations can be made to the embodiment so long as such alterations do not deviate from the intended scope of the present disclosure (e.g., (1) to (4) below).

(1) The present embodiment describes, but is not limited to, a configuration in which the curved portion 331 has a substantially arc shape in cross section. The curved portion 331 may have any shape so long as it has a smooth curved surface concaved in a direction to expand the sheet ejection space 34.

(2) The present embodiment describes, but is not limited to, a configuration in which the reinforcing members 332 each have a substantially semicircle shape in cross section. Alternatively, for example, each of the reinforcing members 332 may have a substantially arc shape in cross section.

(3) The present embodiment describes, but is not limited to, a configuration with the reinforcing members 332 each having a constant width (length in the Y axis direction). Alternatively, for example, the reinforcing members 332 are preferably have a width that decreases toward the front side (side in the positive direction of the X axis). In the above configuration, a user's hand inserted into the sheet ejection space 34 is further unlikely to be caught by the reinforcing members 332. Thus, the above configuration can allow a user to more easily take out a sheet P from the exit tray 311 through insertion of a hand into the sheet ejection space 34.

(4) The present embodiment describes, but is not limited to, a configuration in which the lower surfaces of the reinforcing members 332 are substantially level with a part of the bottom plate 33 located below the operation section 224. Alternatively, for example, the lower surfaces of the reinforcing members 332 are preferably inclined upward (in the positive direction of the Z axis) toward the front side (side in the positive direction of the X axis). In the above configuration, a user's hand inserted into the sheet ejection space 34 is even more unlikely to be caught by the reinforcing members 332. Thus, the above configuration can allow a user to more easily take out a sheet P from the exit tray 311 through insertion of a hand into the sheet ejection space 34.

What is claimed is:

1. An image forming apparatus that forms an image on a recording medium, comprising:
   a scanner configured to scan an image of an original document;
   an exit tray that is disposed below the scanner and onto which a recording medium bearing an image is ejected; and
   a housing that houses the scanner, wherein
   the image forming apparatus has a sheet ejection space that is formed between the exit tray and the housing and into which a user's hand is inserted for taking out the recording medium from the exit tray,
   the housing includes a bottom plate having a surface that faces the exit tray, and the bottom plate includes a plurality of reinforcing members that are disposed on the surface of the bottom plate and that extend in a direction in which the user takes out the recording medium from the exit tray
   the bottom plate of the housing has a curved portion having a smoothly curved surface concaved in a direction to expand the sheet ejection space and includes a guide section configured to guide linear movement of the scanner in a sub-scanning direction,
   the reinforcing members each reinforce the bottom plate and are located on a lower surface of the curved portion of the bottom plate,
   the guide section is curved such that the bottom plate protrudes upward,
   the guide section is located substantially at a central part of the bottom plate in a direction in which the recording medium is taken out,
   the reinforcing members and the curved portion are locate on a tip end side of the guide member in the direction in which the recording medium is taken out,
   the reinforcing members are located a predetermined distance or more apart from the guide section,
   the image forming apparatus further comprises an operation panel configured to receive user input for operation,
   the operation panel is located along an upper surface of the bottom plate at a tip end part of the bottom plate in the direction in which the recording medium is taken out,
   the reinforcing members each extend to a vicinity of the operation panel in the direction in which the recording medium is taken out to form a predetermined space on a side from which the recording medium is taken out, and
   respective lowermost parts of the reinforcing members are substantially level with a lowermost part of the bottom plate located below the operation panel.

2. The image forming apparatus according to claim 1, wherein
   the reinforcing members are located in a region of the bottom plate that is opposite to the recording medium ejected on the exit tray.

3. The image forming apparatus according to claim 1, wherein
   the bottom plate of the housing has an arc shape in cross section.

4. The image forming apparatus according to claim 1, wherein
   the reinforcing members each have a semicircle shape in cross section.

5. The image forming apparatus according to claim 1, wherein
   the reinforcing members extend linearly in a direction in which the recording medium is taken out.

6. The image forming apparatus according to claim 1, wherein
   the exit tray has a first surface and a second surface, the first surface inclining at a first angle in the direction in which the recording medium is taken out relative to a horizontal plane, the second surface inclining at a second angle in the direction in which the recording medium is taken out relative to a horizontal plane,
   the second angle is smaller than the first angle,
   the second surface is located on a tip end side of the exit tray in which the recording medium is taken out relative to the first surface, and the reinforcing members and the curved portion are located opposite to the second surface.

* * * * *